Dec. 19, 1950 J. G. WARNER 2,534,643
METHOD FOR BRAZING BERYLLIUM
Filed Dec. 11, 1948
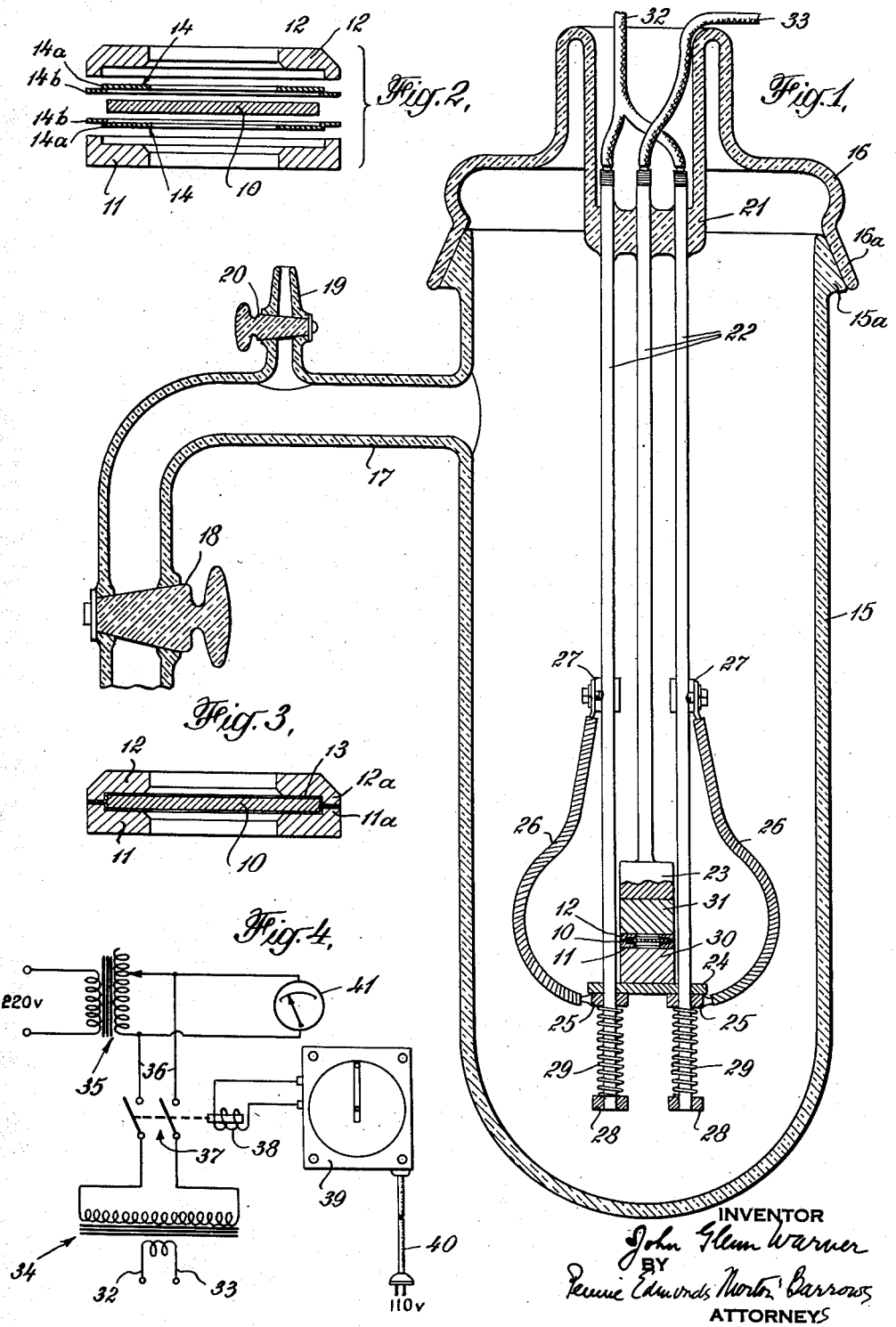

Patented Dec. 19, 1950

2,534,643

UNITED STATES PATENT OFFICE 2,534,643

METHOD FOR BRAZING BERYLLIUM

John Glenn Warner, Springdale, Conn., assignor to Machlett Laboratories Incorporated, Springdale, Conn., a corporation of Connecticut Application December 11, 1948, Serial No. 64,781

4 Claims. (Cl. 219—12)

This invention relates to the production of structures consisting of a member of beryllium or of a beryllium-like material brazed to a base of another metal with a tight joint, an example of such a structure being a thin disc of beryllium secured to a metal washer or between two metal washers and used as a window for the emission of useful rays from an X-ray tube. More particularly, the invention is concerned with a novel method by which satisfactory joints may be made between beryllium and beryllium-like materials and bases of other metals.

Beryllium and materials having substantially the characteristics of beryllium, such as the alloys disclosed in Claussen Patent 2,306,592 issued December 29, 1942, are of great value in X-ray work because of their high degree of transparency to the passage of X-rays, and, in one such use, the beryllium member forms part of the tube envelope and serves as a window through which the rays pass. In another application, the beryllium member lies within the evacuated space and acts as a screen to intercept electrons which might otherwise injuriously bombard elements within the tube. In the first use, the beryllium member is ordinarily joined to a metallic base, which is then united to another part of the envelope and the base ordinarily takes the form of a washer secured to one face of the beryllium member or else the base may include two such washers secured to opposite faces of the member. Since the beryllium member and the base form part of the wall of the envelope, the joint between the beryllium and the base must be vacuum-tight and also capable of withstanding prolonged heating at the temperatures, to which the tube is subjected in processing operations, without becoming leaky. When the beryllium member is used as a screen or shield, it is also commonly attached to a metallic support by brazing.

The brazing of beryllium to a base metal with a good joint is a difficult operation, because many of the metals and alloys commonly employed for brazing will not wet beryllium and, although certain other metals will wet beryllium under proper conditions, their use results in the production of joints that are porous. A major difficulty encountered is the solubility of beryllium in various molten brazing media with the formation in some instances of an alloy of low melting point or the development in the joint of a layer of compound that is highly brittle.

The Agule Patent 2,406,310 discloses methods of brazing of a beryllium member to various bases by the use of different brazing media, and teaches, among other things, that bases of nickel and nickel-copper alloys may be brazed to beryllium by the use of copper as a brazing medium to produce vacuum-tight joints capable of withstanding prolonged heating. In carrying out such a brazing operation in accordance with the teaching of the patent for the production of a beryllium window for X-ray tube use, an assembly consisting of a beryllium disc, a thin copper washer, and a base of washer form is first produced and the assembly is placed upon a support with the base down, so that the support closes the opening in the base. Pressure is applied to force the assembly toward the base and the assembly is placed within a double walled vessel, the interior of which is then evacuated. While cooling water is circulated between the walls of the vessel, the assembly is heated by an induction heating coil, until the copper washer becomes molten and is observed to flow at the outer edge of the assembly.

While it is possible to produce satisfactory vacuum-tight assemblies by the method of brazing described in the patent, the operation is hard to control for the following reasons. In order to start the brazing, the copper washer must be heated to its melt point so that it will wet and alloy with the beryllium, but the alloying should not penetrate too deeply into the beryllium. Once the copper starts to flow, however, beryllium-copper alloys of a melt point lower than that of copper are immediately formed and the alloying effect is increased. In order to obtain good joints by the patented method, it is, therefore, necessary that the copper washer reach the melt point and that the heating thereafter be almost immediately discontinued, so that over-alloying may be prevented. It is difficult, however, for the operator to know just when to stop the heating, because he must determine this instant by watching for the appearance of molten copper at the edge of the assembly and his vision is obscured by the turns of the heating coil, the two walls of the container, and the layer of water flowing between them. Also, the poor linkage between the heating coil and the assembly results in a large portion of the mounting being heated, so that the assembly does not lose temperature rapidly. This factor adds to the difficulty of carrying on the operation in such a way that the copper melts and wets the beryllium but over-alloying of the copper and the beryllium is avoided.

The present invention is directed to the provision of a method of securing a member made substantially entirely of beryllium to a metallic base by a brazing operation, which is more easily controlled than the method of the Agule patent and thus produces a higher yield of satisfactory products. In the new method, the brazing medium employed is a beryllium-copper alloy, which melts at a lower temperature than pure copper, so that its use for brazing purposes does not require so high a temperature. In addition, the assembly of base, brazing medium, and beryllium member to be secured together are raised to the desired temperature by resistance heating, in which a predetermined voltage is applied to the assembly for a predetermined time. Since the heating is to be carried on for a definite time with a given impressed voltage, the heating circuit may be provided with a timer, so that, when the heating has been continued sufficiently long, the current is automatically cut off. In the operation, the brazing medium is maintained molten by the current flow for only a few seconds and undesirable over-alloying is readily avoided.

For a better understanding of the invention, reference may be made to the accompanying drawing, in which Fig. 1 is a view in longitudinal section through one form of apparatus for carrying out the new method;

Fig. 2 is an expanded sectional view showing the parts of structure to be made together by the new method;

Fig. 3 is a sectional view through the completed structure; and

Fig. 4 is a wiring diagram for the apparatus.

In the drawing, the structure for carrying out the new method is illustrated as comprising a disc 10 of beryllium or the high beryllium alloy of Claussen Patent 2,306,592, and a pair of washers 11, 12, which are secured to opposite faces of the disc and may have peripheral flanges 11a, 12a, which meet to enclose the edge of the disc. The base washers are of nickel or nickel-copper alloys, if vacuum-tight joints capable of withstanding prolonged heating during tube processing are to be made, and washers of Monel metal are entirely satisfactory.

The base washers are secured to the disc by thin layers 13 of a brazing medium, which is a beryllium-copper alloy, for example, one containing from about 1.95% to about 2.25% beryllium and the balance copper. Such an alloy becomes a mixture of liquid and solid at a temperature of about 880° C. and is wholly liquid at about 980° C. When the assembly is pressed together sufficiently firmly, a good joint may be obtained without heating to a temperature at which the brazing medium is wholly liquid. As pure copper melts at 1083° C., it will be apparent that the use as the brazing medium of the beryllium-copper described affords an important advantage with respect to the temperature required. The beryllium-copper eutectic includes about 5.1% beryllium and melts at about 850° C., so that it is to be preferred as the brazing medium because of the low temperature required in its use. However, the use of the eutectic involves some disadvantages, because it is so brittle that it cannot be rolled to sheet form and washers of the eutectic composition for use in the practice of the new method, accordingly, cannot be made by cutting them from a sheet.

The brazing medium is employed in the form of thin washers 14, each of which may have a peripheral flange 14a of sufficient internal diameter, so that the flange will fit over the edge of the disc 10. Each flange has a length equal to about one-half the thickness of the disc and is provided with an extension 14b from its free end, which lies parallel to the plane of the main part of the washer.

In carrying out the brazing operation, the parts are assembled as indicated in Fig. 2. The brazing washers 14 are first applied to opposite faces of the disc with the flanges of the washers overlying the edge of the disc and the extensions on the washers lying face to face. The base washers 11, 12 are then applied to the outer faces of the brazing washers with the ends of the flanges on the base washers engaging the extensions on the brazing washers. The assembly is then ready to be heated.

The heating operation is carried on in the apparatus, which includes a vessel 15, preferably of glass and having an opening at one end, which may be closed by a removable cap 16. The vessel is provided with a peripheral flange 15a surrounding the opening and receivable within the rim 16a of the cap, the engaging surfaces of the flange and cap being ground, so that the cap may be mounted on the vessel with the vacuum-tight joint. The vessel is provided with an outlet tube 17 containing a stop-cock 18, beyond which the tube may be connected to the intake of a vacuum pump system to evacuate the interior of the vessel. The outlet tube is also provided with a vent 19 leading to the atmosphere and controlled by a stop-cock 20.

The cap is formed with a re-entrant end 21 through the wall of which are sealed a plurality of stiff conducting rods 22. In the construction illustrated, the rods are arranged in a row and the central rod is shorter than the two outer ones. The central rod carries at its lower end a block 23 made of a refractive conductive material, such as molybdenum. A plate 24, also made of refractory conductive material such as molybdenum, is mounted for sliding movement on the outer rods 22 and beneath plate 24, the rods are encircled by conducting rings 25, each of which is connected by a flexible conductor 26 to a clamp 27 lying a substantial distance upwardly from the lower ends of its rod. Each of the outer rods 22 is provided with a stop 28 at its lower end and a spring 29 encircling the rod engages the stop and the conductive ring 25 on the rod and urges the ring and support 24 upwardly toward the fixed block 23. In the use of the apparatus, the assembly is placed upon a block 30 of carbon or other high resistance material, which rests on plate 24, and a block 31 of like material engages the top of the assembly and the lower surface of block 23.

The outer rods 22 are connected to a conductor 32 and the central rod is connected to a conductor 33. These conductors receive current at low voltage from the secondary of a transformer 34, the primary of which is supplied with current from the secondary of another transformer 35. The lines 36 connecting the secondary of transformer 35 to the primary of transformer 34 contain a switch 37 operable by a solenoid 38, which is controlled by a timer 39 supplied with current through a line 40. A voltmeter 41 is connected across the secondary of transformer 35.

In using the apparatus to carry out the invention, the cover of the vessel is removed and the assembly to be brazed is placed between the high resistance blocks 30 and 31, which lie between block 23 and plate 24. The springs 29 cause the parts of the assembly to be forced tightly together and, when the assembly has been properly mounted in the clamping device, the cover is reseated on the end of the vessel, the vent cock 20 is closed, the cock 18 is opened, and the pumping system is started to evacuate the vessel. When the desired degree of vacuum has been obtained, the timer 39 is set to close switch 37. While cock 18 remains open and the pumps continue to operate, current flows through the conductors 32, 33, the rods 22, block 23 and plate 24, the high resistance blocks 30, 31 and the assembly between blocks 30, 31. The high resistance blocks are quickly heated by the passage of the current therethrough and the assembly is heated by conduction from those blocks. The current continues to flow for a given time, at the end of which the timer 39 operates to open switch 37 and cut off the current supply.

The time required for the brazing operation, at a given impressed voltage, must be determined by experiment and is relatively short. For purposes of explanation, the following example is given. A pair of Monel base washers having a central opening of about .281 inch were brazed in the apparatus described to opposite faces of a disc made of the beryllium alloy of the Claussen patent and having a diameter of about .474 inch, by means of beryllium-copper containing about 2% beryllium and the balance copper. The voltage across conductors 32, 33 was approximately 3.8 volts. It was found that the carbon blocks became uniformly red in about 30 seconds, and the brazing washers melted suddenly at about 40 seconds. The current was cut off about 2 seconds after the washers became molten, so that the overall time of the operation was about 42 seconds.

The base of a structure made by the method described may be secured to a part of an X-ray tube, such as an anode, by ordinary soldering methods employing silver solders, for example, with the operation carried on in hydrogen or other reducing or inert atmospheres. The melting point of the beryllium-copper alloy joint between the base and the beryllium disc is so high that the joint is not affected in such soldering operations. Also, the melting point of the alloy in the joint is such that the joint is not affected by prolonged reheating at temperatures approaching 700° C. during the processing of the tube.

I claim:

1. A method of securing a member made substantially entirely of beryllium to a metallic base, which comprises placing the base and the member against opposite faces of a thin layer of an alloy consisting of copper and an appreciable amount of beryllium not exceeding about 5.1% to form an assembly, placing the assembly between blocks of high resistance material, applying pressure through the blocks to opposite faces of the assembly, evacuating the space about the assembly and blocks, and, while the pressure on the assembly is maintained, passing current through the assembly and the blocks for a predetermined time to melt the thin layer.

2. A method of securing a pair of metallic mounting washers to opposite faces of a disc made substantially entirely of beryllium, which comprises providing a pair of like metallic mounting washers, each having a cylindrical flange along its outer periphery, the inner diameter of the flange being greater than the diameter of the disc, providing a pair of thin washers of an alloy consisting of copper and an appreciable amount of beryllium not exceeding about 5.1%, each thin washer having an inner diameter approximately the same as that of the mounting washers and a cylindrical flange along its outer periphery of a size capable of receiving the disc and of fitting within the flange on a mounting washer, the flange on the thin washer being of a length about half the thickness of the disc and having an annular extension at its free end lying parallel to the plane of the washer, forming an assembly by placing the thin washers against opposite faces of the disc with their flanges overlying the edge of the disc and their extensions opposed and placing the mounting washers, with their flanges opposed, against the outer faces of the thin washers, placing the assembly between high resistance blocks, applying pressure through the blocks to the assembly, evacuating the space around the assembly and blocks, and, while the pressure is maintained, passing current through the assembly and blocks for a predetermined time to melt the thin washers.

3. A method of securing a mounting washer to a disc made substantially entirely of beryllium which comprises providing a thin washer of beryllium-copper consisting of from 1.95% to 2.25% beryllium and the remainder copper, the thin washer having approximately the same inner and outer diameters as the mounting washer, forming an assembly by placing the disc and mounting washers against opposite faces of the berryllium-copper washer and concentrically therewith, placing the assembly between blocks of high resistance material, applying pressure through the blocks to opposite faces of the assembly, evacuating the space about the assembly and blocks, and, while the pressure on the assembly is maintained, passing current through the assembly and blocks for a predetermined time to melt the beryllium-copper washer.

4. A method of securing a member made substantially entirely of beryllium to a metallic base, which comprises forming an assembly by placing the base and member against opposite faces of a thin layer of an alloy consisting of copper and an appreciable amount of beryllium not exceeding about 5.1%, applying pressure to opposite faces of the assembly, evacuating the space about the assembly, and, while pressure on the assembly is maintained, causing current to flow through the assembly from one outer face thereof to the other for a predetermined time to melt the alloy layer.

JOHN GLENN WARNER.

REFERENCES CITED

The following references are of record in the file of this patent:

UNITED STATES PATENTS

| Number | Name | Date |
|---|---|---|
| 496,019 | Thomson | Apr. 25, 1893 |
| 1,893,380 | Uschman et al. | Jan. 3, 1933 |
| 1,966,260 | Munson | July 10, 1934 |
| 2,084,268 | Quarnstrom | June 15, 1937 |
| 2,151,989 | Quarnstrom | Mar. 28, 1939 |
| 2,196,303 | Hensel et al. | Apr. 9, 1940 |
| 2,214,108 | Nichols | Sept. 10, 1940 |
| 2,255,550 | Nichols et al. | Sept. 9, 1941 |
| 2,264,868 | Barnes | Dec. 2, 1941 |
| 2,279,854 | Whitney | Apr. 14, 1942 |
| 2,394,984 | Claussen | Feb. 19, 1946 |
| 2,406,310 | Agule | Aug. 27, 1946 |
| 2,410,665 | Lea et al. | Nov. 5, 1946 |
| 2,435,789 | Lea et al. | Feb. 10, 1948 |

OTHER REFERENCES

Bulletin No. 12–A (1943), pages 16 and 17, Handy and Harman, 82 Fulton Street, New York, New York. Copy in Div. 60.